US012675195B2

(12) United States Patent
Zeuner et al.

(10) Patent No.: US 12,675,195 B2
(45) Date of Patent: Jul. 7, 2026

(54) OPTICAL WAVEGUIDE LIGHT EMITTER AND TOUCHSCREEN

(71) Applicants: UNIVERSITY OF VIENNA, Vienna (AT); UNIVERSITÄT ROSTOCK, Rostock (DE)

(72) Inventors: Jonas Zeuner, Vienna (AT); Philip Walther, Vienna (AT); Alexander Szameit, Bad Doberan (DE); Matthias Heinrich, Bad Doberan (DE); Lukas Maczewsky, Rostock (DE)

(73) Assignee: UNIVERSITY OF VIENNA, Vienna (AT)

( * ) Notice: Subject to any disclaimer, the term of this patent is extended or adjusted under 35 U.S.C. 154(b) by 86 days.

(21) Appl. No.: 17/263,354

(22) PCT Filed: Jul. 25, 2019

(86) PCT No.: PCT/EP2019/070105
§ 371 (c)(1),
(2) Date: Jan. 26, 2021

(87) PCT Pub. No.: WO2020/021037
PCT Pub. Date: Jan. 30, 2020

(65) Prior Publication Data
US 2021/0157443 A1 May 27, 2021

(30) Foreign Application Priority Data
Jul. 26, 2018 (EP) .................................... 18185875

(51) Int. Cl.
*G06F 3/042* (2006.01)
*F21V 8/00* (2006.01)

(52) U.S. Cl.
CPC ......... *G06F 3/0421* (2013.01); *G02B 6/0036* (2013.01); *G02B 6/0068* (2013.01)

(58) Field of Classification Search
CPC ... G06F 3/0421; G02B 6/0036; G02B 6/0068; G02B 6/04; G02B 6/13; G02B 6/0078; G02B 6/0001
See application file for complete search history.

(56) References Cited

U.S. PATENT DOCUMENTS

| | | | | | |
|---|---|---|---|---|---|
| 5,623,561 | A | * | 4/1997 | Hartman | ................ G01N 21/45 385/12 |
| 5,914,709 | A | * | 6/1999 | Graham | ................... G02B 6/32 345/173 |

(Continued)

FOREIGN PATENT DOCUMENTS

| | | |
|---|---|---|
| AT | 413 891 B | 7/2006 |
| CN | 1511301 A | 7/2004 |

(Continued)

OTHER PUBLICATIONS

International Search Report and Written Opinion of the International Searching Authority for International Patent Application No. PCT/EP2019/070105 mailed Aug. 16, 2019, 12 pages.

(Continued)

*Primary Examiner* — Bryan Earles
(74) *Attorney, Agent, or Firm* — Merchant & Gould P.C.

(57) ABSTRACT
An optical device for controlling light and an optical touch sensing device are formed by direct laser writing in a transparent substrate to manufacture one or more optical waveguides therein.

20 Claims, 8 Drawing Sheets

(56) References Cited

U.S. PATENT DOCUMENTS

| | | | | |
|---|---|---|---|---|
| 6,226,426 | B1 * | 5/2001 | Magne | G02B 6/12007 385/24 |
| 7,991,257 | B1 * | 8/2011 | Coleman | G02B 6/0036 264/494 |
| 9,041,690 | B2 * | 5/2015 | Cui | G06F 3/0421 178/18.09 |
| 2007/0086712 | A1 * | 4/2007 | Shani | G02B 6/0028 385/101 |
| 2008/0044127 | A1 | 2/2008 | Leising et al. | |
| 2008/0106527 | A1 * | 5/2008 | Cornish | G06F 3/0421 385/33 |
| 2013/0202488 | A1 | 8/2013 | Langer | |
| 2016/0306114 | A1 * | 10/2016 | Kashyap | G02B 6/1345 |

FOREIGN PATENT DOCUMENTS

| | | |
|---|---|---|
| CN | 101000525 A | 7/2007 |
| CN | 101211246 A | 7/2008 |
| CN | 104813263 A | 7/2015 |
| CN | 106471449 A | 3/2017 |
| CN | 106814919 A | 6/2017 |
| CN | 206421354 U | 8/2017 |
| JP | 2011128321 A | 6/2011 |
| KR | 10-2007-0100729 A | 10/2007 |
| KR | 10-2016-0098302 A | 8/2016 |
| WO | 2005064381 A1 | 7/2005 |
| WO | 2006064500 A2 | 6/2006 |
| WO | 2007/046100 A2 | 4/2007 |
| WO | 2015155508 A1 | 10/2015 |
| WO | 2015192157 A1 | 12/2015 |

OTHER PUBLICATIONS

Extended European Search Report for European Patent Application No. 18185875.4 mailed Jan. 4, 2019, 10 pages.

Houbertz, R. et al., "Optical Waveguides Embedded in PCBs—A Real World Application of 3D Structures Written by TPA", MRS Proceedings, 1054: 1-1 (Jan. 2007), Abstract.

Qing, et al., "Introduction to Flat Panel Display Substrate Glass Technology", Hebei Science and Technology Press, Jun. 30, 2017.

Chinese Office Action received for CN Application No. 201980047130.1 on Mar. 20, 2025, 20 pgs.

Notice of Preliminary Rejection received for KR Application No. 10-2021-7000243 on May 9, 2024, 10 pgs.

Chinese Office Action received for CN Application No. 201980047130.1 on Mar. 29, 2024, 30 pgs.

* cited by examiner

OPTICAL WAVEGUIDE LIGHT EMITTER AND TOUCHSCREEN

This application is a National Stage Application of PCT/EP2019/070105, filed 25 Jul. 2019, which claims benefit of European Patent Application Serial No. 18185875.4, filed 26 Jul. 2018, and which applications are incorporated herein by reference. To the extent appropriate, a claim of priority is made to each of the above-disclosed applications.

TECHNICAL FIELD

The present invention relates to an optical device for controlling light and an optical touch sensing device, specifically such devices formed by direct laser writing in a transparent substrate to manufacture one or more optical waveguides therein.

BACKGROUND

Transparent, volumetric and holographic displays have been a longstanding goal of research and are frequently presented in popular science fiction. Moving them from the realms of imagination to reality, though, has proven difficult for numerous reasons. For example, embedding electronics in transparent materials is difficult. This is why the only commercially-used form of transparent displays uses projectors i.e. head-up displays. Conventional transparent displays typically have a low degree of transparency e.g. <50% and bad image quality. Holographic displays, on the other hand, require all pixels to emit light with well-defined phases, which has proven difficult to scale up from proof-of-concept demonstrations. Lastly, volumetric displays need pixels to be distributed within a transparent volume and ideally, should emit light only into the desired direction, something which has never been demonstrated without sacrificing full parallax.

Displays have become an integral part of human life and have been necessary ingredients for technologies like television, computers and smartphones, creating a worldwide electronic display industry worth more than $300 Billion a year. Continuous research and investment have spawned many different display technologies, the most important ones being Cathode Ray Tube, Liquid-Crystal Display (LCD), Plasma Display Panel, Quantum-dot-based LED, Digital Light Processing, E-paper and organic light-emitting diode (OLED), each offering unique advantages and drawbacks. Among the drawbacks all these technologies share is the inability to use anything but (close to) flat surfaces, having low degrees of transparency and not allowing for coherent light emission from different pixels. Overcoming some or all of these problems would allow to build transparent, volumetric or even holographic displays.

Transparent displays are often used in popular fiction due to their superior looks but, in reality, also open up completely new usage scenarios, ranging from displays implemented in windows to stacked displays in Augmented Reality or Virtual Reality goggles. So far though, they have proven difficult to build. To date, the most advanced prototypes are OLED displays using transparent electrodes, but they have so far failed to leave the laboratory.

Volumetric displays emit light not from a plane but from within a volume, which is why their pixels are called voxels. Many different types of volumetric displays exist, underpinned by a large variety of different technologies, but they all share the aim of creating 3D images within their volume. Volumetric displays are by design autostereoscopic, meaning that the 3D image is directly visible to the unaided eye. Ideally, the image can be projected into the thin air and, crucially, also allow for occlusion: If voxels radiate uniformly in all directions, all objects are displayed as transparent, i.e. both the front and the back of an object are visible at the same time and overlaid. To avoid this, the voxels should emit light only in specific directions, leading to the effect that one part of the 3D image can occlude another part.

Holographic displays are, in a sense, the ultimate display, because they are in principle able to faithfully recreate the entire light pattern emitted from a scene. Two approaches for generating such light patterns exist: light field displays (ray optics picture) and holographic displays (wavefront picture), which are sometimes used interchangeably, even though only the latter model is able to describe coherent phase fronts and is the model we will use. Creating high quality holographic displays requires pixel spacing on the order of the wavelength, independently from the actual size of the display, hence typically pixel counts above 10 are necessary for common sized displays. The light emitted from each pixel must have a well-defined phase relationship with all other pixels, which is why typically a single laser is used as light source, from which the light is then distributed over all pixels. The relative phase between all pixels must be tunable between 0 and 27, which then allows for the creation of arbitrary wavefronts emitted from the display. The most advanced holographic displays to date use spatial light modulators illuminated from the back by a laser, but remain very limited in their size and feature only narrow viewing angles.

Touch recognition technology for displays is currently almost exclusively implemented by using either resistive or capacitive touch recognition. Resistive touch recognition technology suffers from several problems, limited image quality due to additional material layers on top of the screen, requiring force (pushing down) for registering touch events, typically only being water resistant to a certain level (IP67) and not working underwater.

Furthermore, capacitive touch displays require a thin sheet of thin film conductors on top of the screen which limits transparency. They do not function properly with water droplets on the surface and not at all if the entire surface is wet. Scaling capacitive touch technology to large display sizes also remains problematic due to high sheet resistance.

SUMMARY OF INVENTION

It is an aim of the present invention to provide a new kind of light emitting and touch sensing technology to enable facilitated, economical and scalable construction of, for example, transparent, volumetric and holographic displays.

The present application presents a novel technology that addresses all of the aforementioned problems and is based on the fabrication of optical waveguides within a transparent substrate using a direct laser writing technique with a femto-second laser. In general, the optical waveguides originate at the side of the transparent material (which can form a display plane), where light from one or more light sources can be input into them. The optical waveguides can terminate at any desired point within the transparent substrate leading to a well-defined direction of the light's emission and consequently to the creation of a visual display. Furthermore, the present application also introduces two ways in which optical waveguides can be used to implement touch recognition in a transparent substrate.

In a first aspect of the invention, an optical device for controlling light is provided which comprises a transparent substrate having one or more surfaces for emitting light and one or more optical waveguides formed within the transparent substrate by means of direct laser writing and each extending through the transparent substrate before curving toward the one or more surfaces and terminating at one or more outputs within the transparent substrate or at the one or more surfaces of the transparent substrate. The microscopic optical waveguide(s) consist of a tiny modification in the refractive index of the transparent substrate which enables a high level of transparency of the transparent substrate to be maintained as the optical waveguides are not visible to the naked eye. Furthermore, multiple optical waveguides and outputs can further be configured to emit light in a single direction e.g. perpendicular to the surface of the transparent substrate in order to, for example, form a backlight for an LCD display or a torch.

In a second aspect of the invention, an optical touch sensing device is provided which comprises a transparent substrate having one or more touch surfaces, one or more light sources, one or more photodetectors, one or more optical waveguides formed within the substrate by means of direct laser writing, wherein each of the optical waveguides is in optical communication with at least one of the light sources and at least one of the photodetectors and comprises one or more outputs from which light may be emitted, and wherein the device is configured to determine a change in amplitude of light transmitted through the one or more optical waveguides when an object is proximal or in contact with the touch surface and associate the change in amplitude of light transmitted with one or more points on the touch surface. According to the second aspect of the invention, optical waveguides enable formation of a highly accurate touch functionality in a transparent substrate with high transparency. This advantageously enables touch sensing functionality on one or more i.e. multiple surfaces of the same transparent substrate, wherein the touch functionality works even if the touch surface is wet or underwater.

In a preferred embodiment of the second aspect of the invention, at least one output of the one or more optical waveguides is substantially perpendicular to the touch surface and the device is configured to determine changes in backreflection based on the determined change in amplitude of light from the output through the one or more optical waveguides. This advantageously enables a touch sensing functionality using one or more outputs of the optical waveguides. In this preferred embodiment a touch is determined by measuring the change in light amplitude and calculating the level of backreflection from the determined change in light amplitude when an object such as a finger or pen touches the output of the waveguide.

In an alternative preferred embodiment of the second aspect of the invention, the one or more waveguides are formed substantially parallel to the touch surface and the device is configured to determine a change in the evanescent field from the change in light amplitude through the one or more waveguides when an object such as a finger or pen is proximal or touches the touch surface. This advantageously enables touch sensing using one or more longitudinal paths of the waveguides and is determined by measuring changes in the evanescent field of the waveguides when an object comes in close proximity to, or contacts the touch surface and calculating level of loss of optical power transmission caused thereby.

In a preferred embodiment of both first and second aspects of the invention, the optical device for controlling light and/or optical touch sensing device further comprises a plurality of optical waveguides, wherein the respective outputs of the plurality of optical waveguides form a visual display. By providing a plurality of optical waveguides, the device can be configured to form pixels or voxels in order to form highly transparent, volumetric or holographic displays.

In an alternative preferred embodiment of both the first and second aspects of the invention, the optical device for controlling light and/or optical touch sensing device further comprises a plurality of optical waveguides, wherein the respective outputs of the plurality of optical waveguides form a backlight for a visual display. By providing a plurality of optical waveguides whose outputs are directed toward a visual display i.e. a liquid crystal display (LCD), the optical device for controlling light can be configured to be a highly efficient LCD backlight as shown in FIG. 6. In a preferred implementation thereof, the optical device for controlling light which forms the backlight has one waveguide per subpixel of the LCD. This beneficially allows the backlight to guide light with the correct wavelength (colour) and polarisation to each subpixel, thereby cutting light loss by a factor of three for the colour filtering and by a factor of two for the polarisation filtering (combined a factor of six). In an preferred implementation of the aforementioned backlight embodiment, the transparent substrate comprises wedges for reflecting light towards the one or more outputs or the one or more surfaces of the transparent substrate as shown in FIG. 7. This enables out of plane light emission to be realised using the wedges cut into the transparent substrate, for example glass which leads to total internal reflection.

In a preferred embodiment of both first and second aspects of the invention, the optical device for controlling light and/or optical touch sensing device further comprises one or more light sources configured to transmit light into an input of each of the plurality of optical waveguides, wherein the one or more light sources are single mode light sources and/or multimode light sources. Configuration for single mode light enables smaller curvatures in the optical waveguides, thereby enabling a thinner substrate/display surface i.e. that could be integrated in small electronic devices and higher resolution whereas configuration for multimode light enables reduces costs of construction due to multimode light sources being cheaper.

In a further preferred embodiment of both first and second aspects of the invention, the respective outputs of the plurality of optical waveguides of the optical device for controlling light and/or optical touch sensing device form an array. The array may be in the form of a grid. This advantageously enables the formation of multiple pixels for a visual display.

In another preferred embodiment of both first and second aspects of the invention, the outputs of the plurality of optical waveguides are formed at different distances from the surface of the transparent substrate. This advantageously enables a great variety of light emission or display geometries.

In another preferred embodiment of both first and second aspects of the invention, the transparent substrate consists of either glass, preferably borosilicate glass, or crystal, preferably sapphire, or thermoplastic polymer. This enables extremely thin and highly transparent substrates/displays to be formed, higher transparency is advantageous for volumetric displays in order to minimise loss of light amplitude through the transparent substrate and achieve high image resolution, even for optical waveguide outputs at greater distances from the surface of the transparent substrate.

According to both first and second aspects of the invention, the one or more optical waveguides are formed by means of direct laser writing. The use of a femto-second laser for direct laser writing advantageously enables direct formation of waveguides within a transparent substrate allowing the creation of a highly transparent display and/or optical touch sensing surface with high precision and at low cost.

In a third aspect of the invention, an integrated optical touch sensing display device is provided which comprises the optical device for controlling light of the first aspect of the invention and the optical touch sensing device of the second aspect of the invention and optionally one or more of the preferred embodiments thereof. In particular, in a preferred embodiment, a plurality of optical waveguides in the transparent substrate may act both to direct the light to a surface of the transparent substrate for display purposes, whilst also functioning as a conduit for backreflection of the light and thereby enable the touch sensing functionality. In an alternative embodiment, due to the small dimensions of the optical waveguides, more than one set of optical waveguides may be directly laser written in the transparent substrate, wherein a first set of optical waveguides directs input light for display purposes, whilst a second set of optical waveguides directs light for touch sensing functionality.

BRIEF DESCRIPTION OF THE DRAWINGS

FIG. 2A shows the grid illuminated with red light with a wavelength of 650 nm.

FIG. 2B shows the grid illuminated with green light with a wavelength of 540 nm.

FIG. 2C shows the grid illuminated with blue light with a wavelength of 450 nm.

FIG. 7A shows a render of a cylindrical volumetric display showing a car.

FIG. 7B shows a schematic of a volumetric display with a depth of two voxels. The arrows indicate light emission directions from the waveguides terminating at the position of the voxel. Each arrow direction generates a new viewing direction ("static-volume").

In FIG. 7C, by rotating the cylinder only one waveguide per voxel is required for horizontal parallax ("swept-volume").

DETAILED DESCRIPTION OF PREFERRED IMPLEMENTATIONS OF THE INVENTION

Figure 1A:
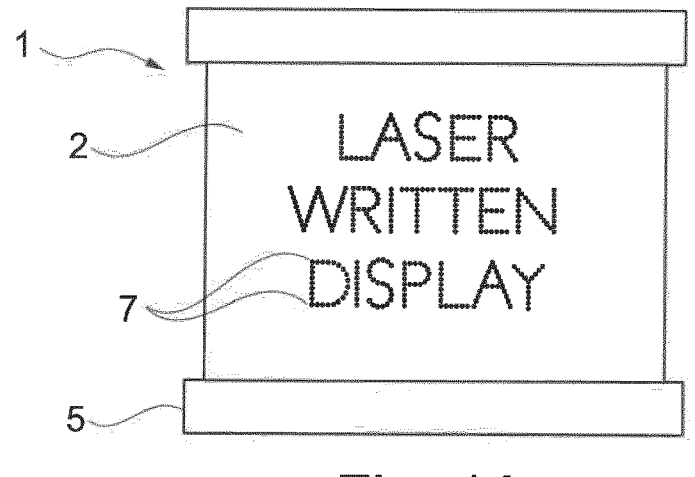
FIGS. 1A to C show direct laser written displays incorporating preferred embodiments of the invention.
Figure 1B:
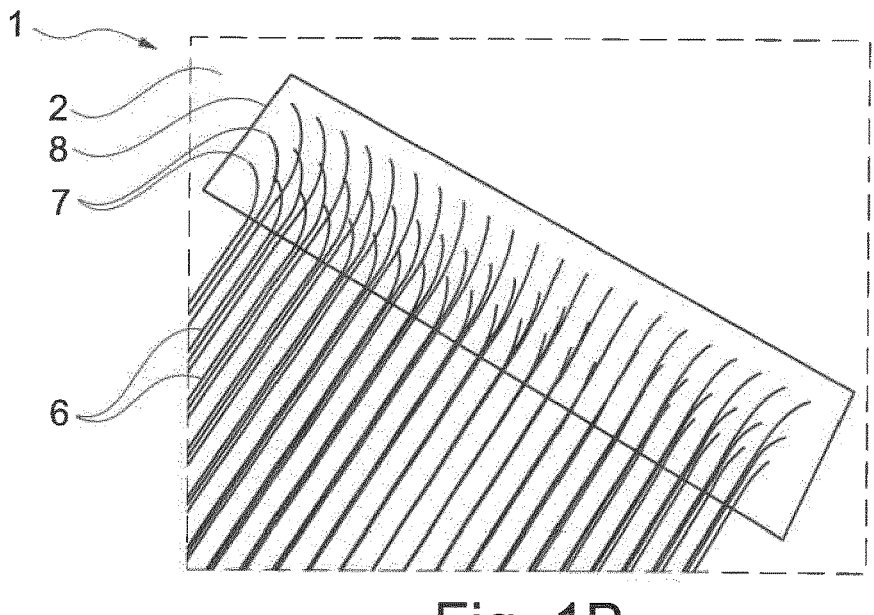
Figure 1C:
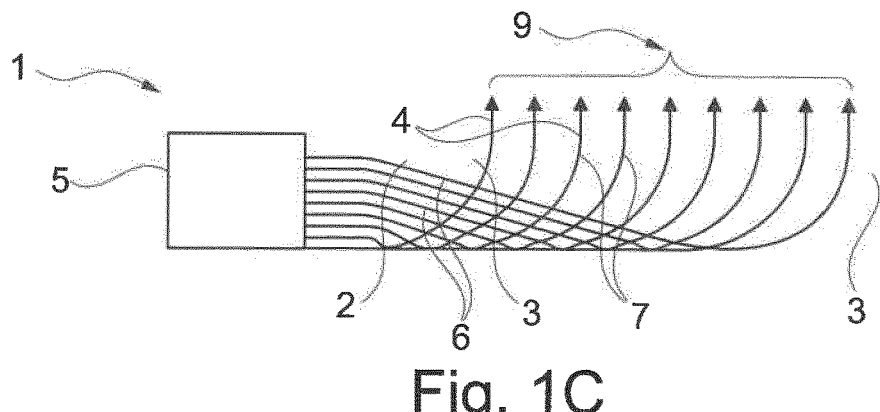

FIGS. 1A to 1C show optical devices 1 for controlling light according to preferred embodiments of the present invention including a transparent substrate 2 having one or more surfaces 3 for emitting light 4 from one or more external light sources 5, one or more optical waveguides 6 formed within the transparent substrate 2 by means of direct laser writing and each extending through the transparent substrate 2 before curving toward the one or more surfaces 3 and terminating at one or more outputs 7 within the transparent substrate 2 or at the one or more surfaces 3 of the transparent substrate 2.

FIG. 1A is a render image of a preferred embodiment of the optical device 1 of the first and second aspects of the present invention implemented as a direct laser written display, wherein light emitted from a light source (not shown) is both launched and detected in the opaque housing below the glass transparent substrate 2.

FIG. 1B is a close up render of one of the light emitting surfaces 3 of the transparent substrate 2 wherein a small display area 8 indicated by the dashed line framing the outputs 7 of the optical waveguide 6. The outputs 7 represent pixels and the optical waveguides 6 are shown by the curved lines.

FIG. 1C shows a preferred embodiment of the present invention comprising a single pixel row 9 comprising a plurality of optical waveguide outputs 7 which make up the individual pixels. It can be seen from FIG. 1C how the minimum radius of curvature of the optical waveguides 6 limits the thickness of the display. FIG. 1C also shows how, in a preferred embodiment, the input of the optical waveguides 6 in the surface 3a of the transparent substrate 2 in which light 4 is input curve downwards away from the surface 3b before curving toward the surface 3b from which the light 4 is subsequently emitted via the outputs 7.

According to a preferred embodiment of the invention a femto-second laser direct writing method is used to fabricate optical waveguides 6 in transparent materials which then act as pixels/voxels. The optical waveguides 6 originate at the side surface 3 of the display and are connected to light sources 5, guiding light 4 to certain points within or at the surface 3 of the display from where it is emitted (see FIG. 1). A visual display can be created by combining many such optical waveguides 6 in an array.

The properties of optical waveguides manufactured using laser writing vary between different materials (among them glasses and polymer materials) and the writing configuration, but they all consist of a small index modification in the material, which are invisible to the naked eye, hence allowing for the creation of transparent displays. Moreover, since the waveguides can take arbitrary paths and terminate at any point within the transparent substrate to emit their light, a great variety of display geometries can be realised.

Apart from this, according to preferred embodiments of the present invention, two techniques for implementing touch recognition in a transparent substrate/display are realised: the first technique works by detecting changes in the backreflections of optical waveguides perpendicular to the surface of the transparent substrate and the second technique by measuring changes in the evanescent field of optical waveguides parallel to the surface of the transparent substrate. These techniques will be described in more detail below with respect to FIGS. 6A to 6C.

The following table shows the minimum pixel/optical waveguide spacing necessary to keep transferred power due to evanescent coupling below 1:10.000 over a propagation distance of 1 m given a certain refractive index contrast and a step-index profile. The values were calculated using a wavelength of 650 nm and $n_{cladding}$=1.456, smaller wavelength will have smaller mode fields and subsequently allow for smaller waveguide spacing.

TABLE 1

| $\Delta n = n_{core} - n_{cladding}$ | 0.0001 | 0.001 | 0.01 | 0.022 | 0.05 |
|---|---|---|---|---|---|
| numerical aperture (NA) | 0.017 | 0.054 | 0.17 | 0.25 | 0.38 |
| core diameter [μm] | 22.7 | 7.2 | 2.3 | 1.5 | 1.0 |
| mode-field-diameter [μm] | 30 | 10 | 3 | 2 | 1.3 |
| min. waveguide spacing [μm] | 81 | 37 | 15 | 11 | 8 |

Figure 2A:
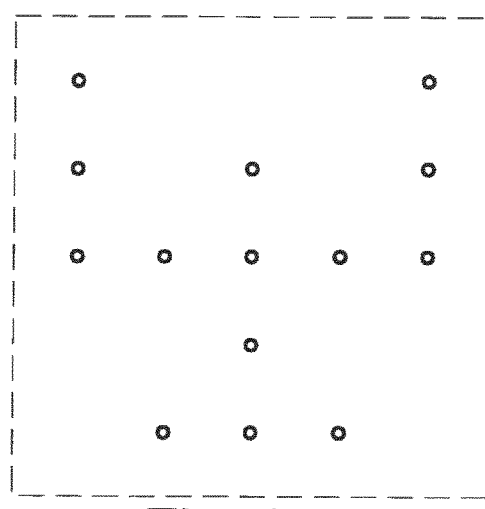
FIGS. 2A to 2C show display prototype images formed using a preferred embodiment of the present invention comprising a 5×5 pixel grid. Each optical waveguide was illuminated separately and the images then superimposed in the computer. The pictures were acquired using a high-resolution microscope and a colour camera.
Figure 2B:
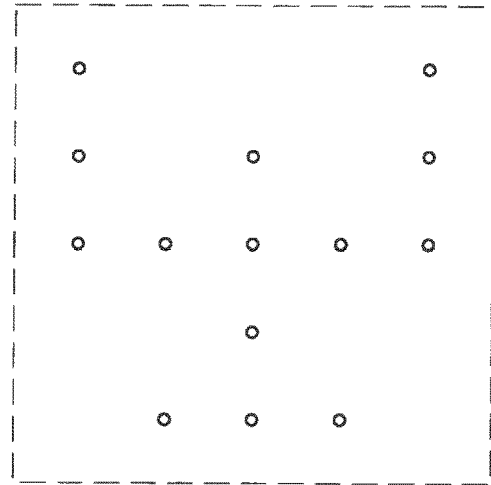
Figure 2C:
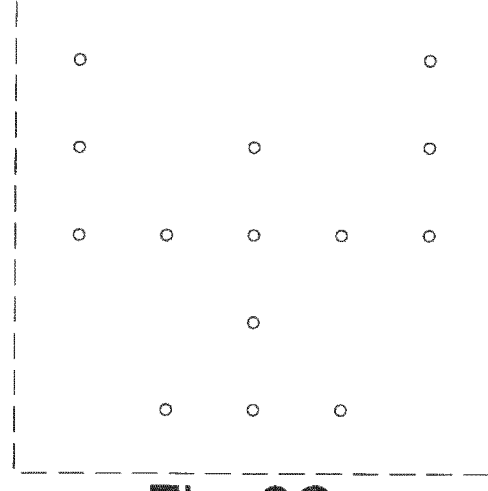

The images produced by a prototype of a direct laser written visual display according to a preferred embodiment of the present invention can be seen in FIGS. 2A to 2C. The 5×5 pixel grid consists of straight multi-mode waveguides with an index contrast of $10^{-4}$, spaced by 50 μm. Light with the wavelengths 450 nm, 540 nm and 650 nm (blue, green and red light) was input into a transparent substrate fabricated as a display chip from fused silica in order to demonstrate its capability to show colour images. Coupling was performed via butt-coupling using a Nufern 780HP optical fibre. The measured insertion loss is 7.5 dB. Generally, losses will strongly depend on the size of the display, the substrate material, the wavelength and the optical waveguide bending radii. The lowest reported loss for laser written waveguides is 0.027 dB/cm in Corning Gorilla Glass. While in a prototype implementation of the present invention, the optical waveguides are straight, a real visual display could feature optical waveguides which have a 900 upward bend or more complex geometries.

Figure 3:
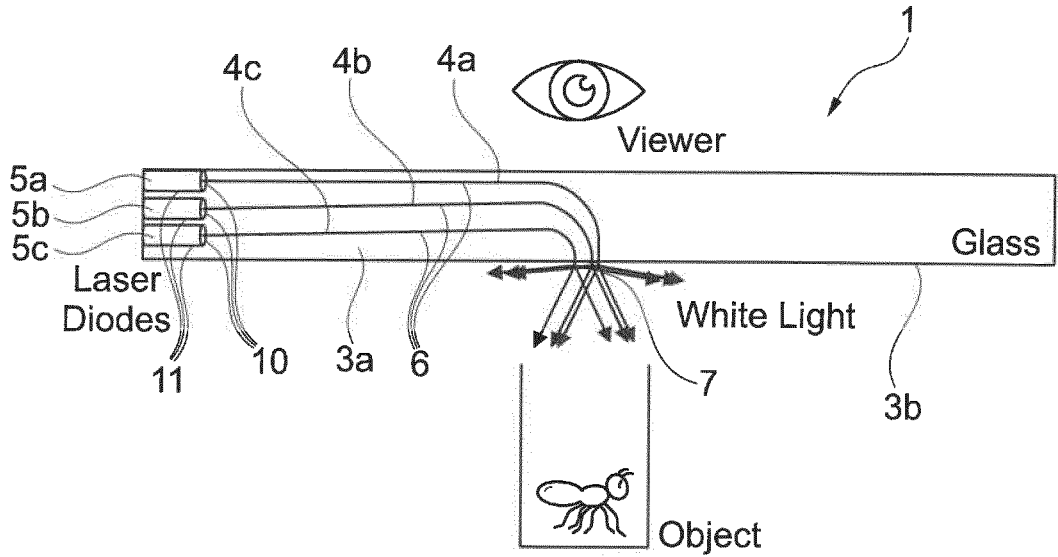
FIG. 3 shows a preferred embodiment of an optical device according to the present invention.

FIG. 3 shows a preferred embodiment of an optical device according to the present invention wherein one or more optical waveguides and outputs are configured to emit light in a single direction perpendicular to the surface to the transparent substrate in order to form a transparent screen for illuminating objects for a viewer to inspect through the illuminating screen. According to the exemplary implementation in FIG. 3, the optical device 1 for controlling light comprises a transparent substrate 2 of glass and a plurality of optical waveguides 6 which are formed therein by means of direct laser writing. The glass substrate 2 is of a rectangular cuboid shape and the optical waveguides 2 are formed such that they form an interface between two different surfaces 3a, 3b of the glass substrate 2. From a first end 10 formed at a first surface 3a of the glass substrate 2 for inputting light, each optical waveguide 6 extends through the glass substrate 2 parallel to the longer sides thereof, before curving almost 90 degrees towards a second surface 3b of the glass substrate 2 for light emission and terminating at an output 7 at the second surface 3b. A light source 5 is placed at the first ends 10 of the optical waveguides 6. The light source 5 includes three laser diodes 5a to 5c, a first laser diode 5a configured to emit red light 4a, a second laser diode 5b configured to emit green light 4b and a third laser diode 5c configured to emit blue light 4c. In FIG. 3, The respective outputs 11 of each laser diode are optically coupled with the first ends 10 of the optical waveguides 6 which are configured to act as inputs for light generated by the laser diodes 5a to 5c. During operation, light emitted from each of the laser diodes 5a to 5c enters the first ends 10 of the optical waveguides 6 with which the respective laser diode 5a to 5c is aligned. The light 4 is reflected within and travels through the respective optical waveguides 6 before reaching the second ends 7 of the optical waveguides 6 which are configured to act as outputs 7 for the light 4 at the second surface 3b of the glass substrate 2.

Figure 4:
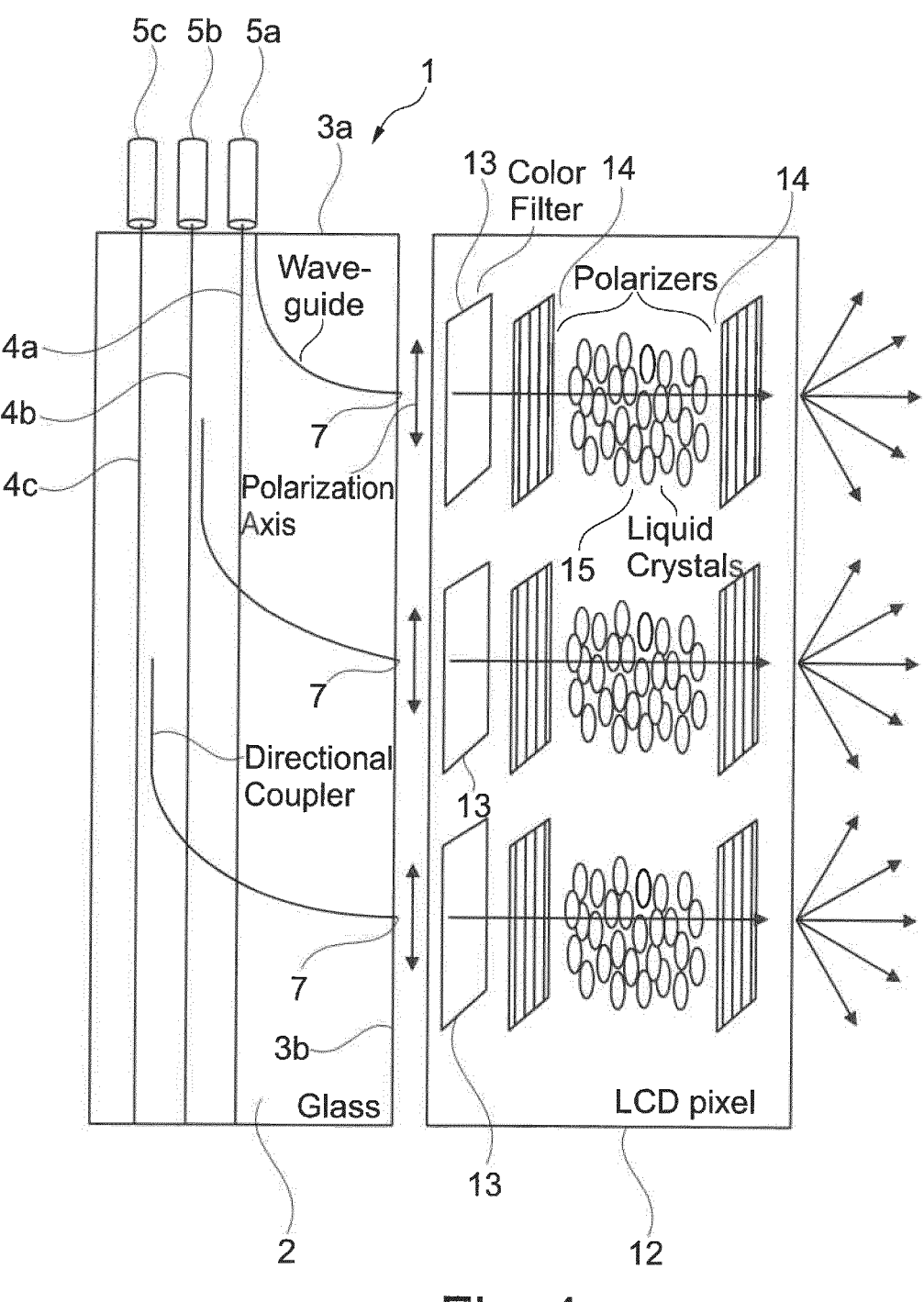
FIG. 4 shows a preferred embodiment of an optical device according to the present invention based on that of FIG. 3.

FIG. 4 is a further preferred implementation of the present invention including the optical device 1 and further features thereof as described above with respect to FIG. 3 wherein multiple optical waveguides and outputs are configured to emit light in a single direction perpendicular to the surface to the transparent substrate in order to form a backlight for an LCD display. According to FIG. 4, an LCD pixel layer 12 is optically coupled with the second, light emitting surface 3b of the glass substrate 2. The LCD pixel layer 12 comprises respective red, green and blue colour filters 13 and, for each colour filter 13, two polarisers 14 between which a layer of liquid crystal 15 is situated. The colour filters 13 and their respective liquid crystal 15 and polarisers 14 are aligned with and optically coupled to the outputs 7 of the glass substrate 2 such that the light 4 emitted from the second surface 3b of the glass substrate 2 travels through the colour filters 13, polarisers 14 and liquid crystals 15 and is scattered at the surface of the LCD pixel layer 12.

Figure 5:
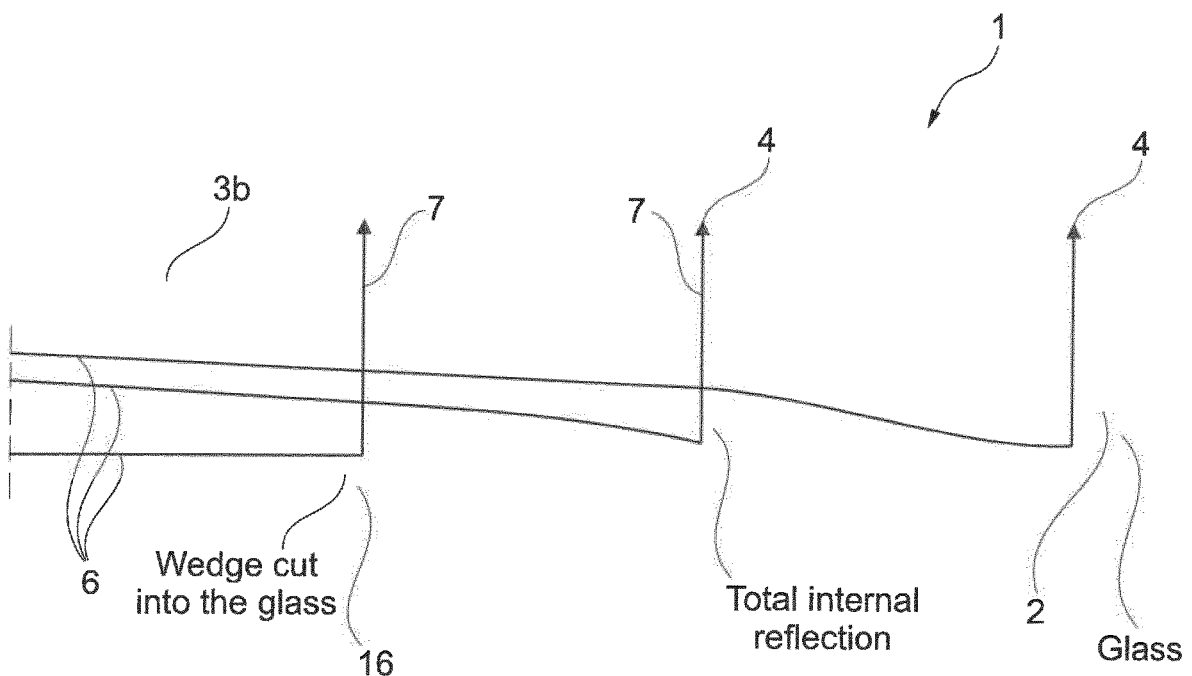
FIG. 5 shows a preferred embodiment of the present invention wherein wedges are cut into the transparent substrate and used to reflect light out of plane using total internal reflection.

In an alternative implementation of those described above with respect to FIGS. 3 and 4, it should be noted that wedges 16 cut into the glass substrate 2 can also be used to reflect light 4 out of plane using total internal reflection as shown in FIG. 5. This is particularly useful for an LCD backlight implementation like the example described with respect to FIG. 4, where full transparency is not required.

Experimentally, bending radii down to 16.6 mm (90° bend, 1 dB loss, X=1550 nm) have been reported using annealing. For optical fibres, which feature similar index contrasts, much lower bend radii have been demonstrated, e.g. 5 mm for the Corning ClearCurve ZBL Optical Fibre, 360° bend, <0.1 dB loss, A=1550 nm).

The pixel spacing of 50 μm demonstrated in our prototype compares well with pixel spacing of state of the art devices from Apple (iPhone X with d=55 μm), Samsung (Galaxy S8 with d=44.6 μm) or Sony (Xperia Z5 Premium with d=31.7 μm). Lowering the pixel spacing, as is necessary for constructing holographic displays, inevitably runs into the problem that neighbouring waveguides start to couple evanescently, i.e. power from one waveguide is transferred to another. The strength of this evanescent coupling depends on the mode-diameter of the light-field propagating in the waveguide, which itself depends on the index contrast.

Experimentally, index contrasts up to $\Delta n=2 \cdot 10^{-2}$ have already been demonstrated in transparent substrates made of fused silica, theoretically allowing for a minimal mode field diameter of $\omega=2.05$ μm and a pixel period of d=10.55 μm at 650 nm wavelength (see Table 1). Since all colours can be guided in one optical waveguide, according to preferred implementations of the present invention, monochromatic displays can have the same pixel density has multi-colour displays.

An important quality factor for 2D displays is the viewing angle. If a viewer watches the display from the side, image quality can suffer, as is the case for LCDs. Generally, the viewing angle depends on the wavefront properties at the output of the optical waveguides. In case of single-mode optical waveguides, the viewing angle can directly be inferred from the beam divergence angle of a Gaussian beam and reads $\theta=\lambda/\pi\omega_0$ where $\theta$ is the divergence angle and $\omega_0$ the beam diameter. To achieve divergence angles of >300 suitable for a general purpose 2D displays, mode field diameters smaller than 1 µm must be achieved. Creating such small waveguides requires a high index contrast (see Table 1). More realistic ideas to increase the viewing angle can be grouped into two subgroups: the coherent and the incoherent approach. In the coherent approach the wavefront of the beam exiting the optical waveguide is shaped in a way to maximise viewing angle. This can be achieved by using optical waveguides that guide higher-order modes which can be generated at the light source or at any point during the optical waveguide, using micro lenses on the transparent substrate surfaces forming the display or by directly modifying the waveguide's end during the writing process. Generating uniform scatter points (e.g. nano-dots, gold particles) on the display surfaces is another possibility.

In the incoherent approach the aim is not to shape the wavefront but to destroy the coherence in it, resulting in many tiny light sources with a large divergence angle. This can be done using a scatter medium at the output of the optical waveguide in combination with a low coherence length light source.

Currently used resistive or capacitive touch recognition system are difficult to implement in combination with a transparent display. According to the second aspect of the present invention, two ways to enable transparent touch recognition using optical waveguides are presented.

Figures 6A, 6B:
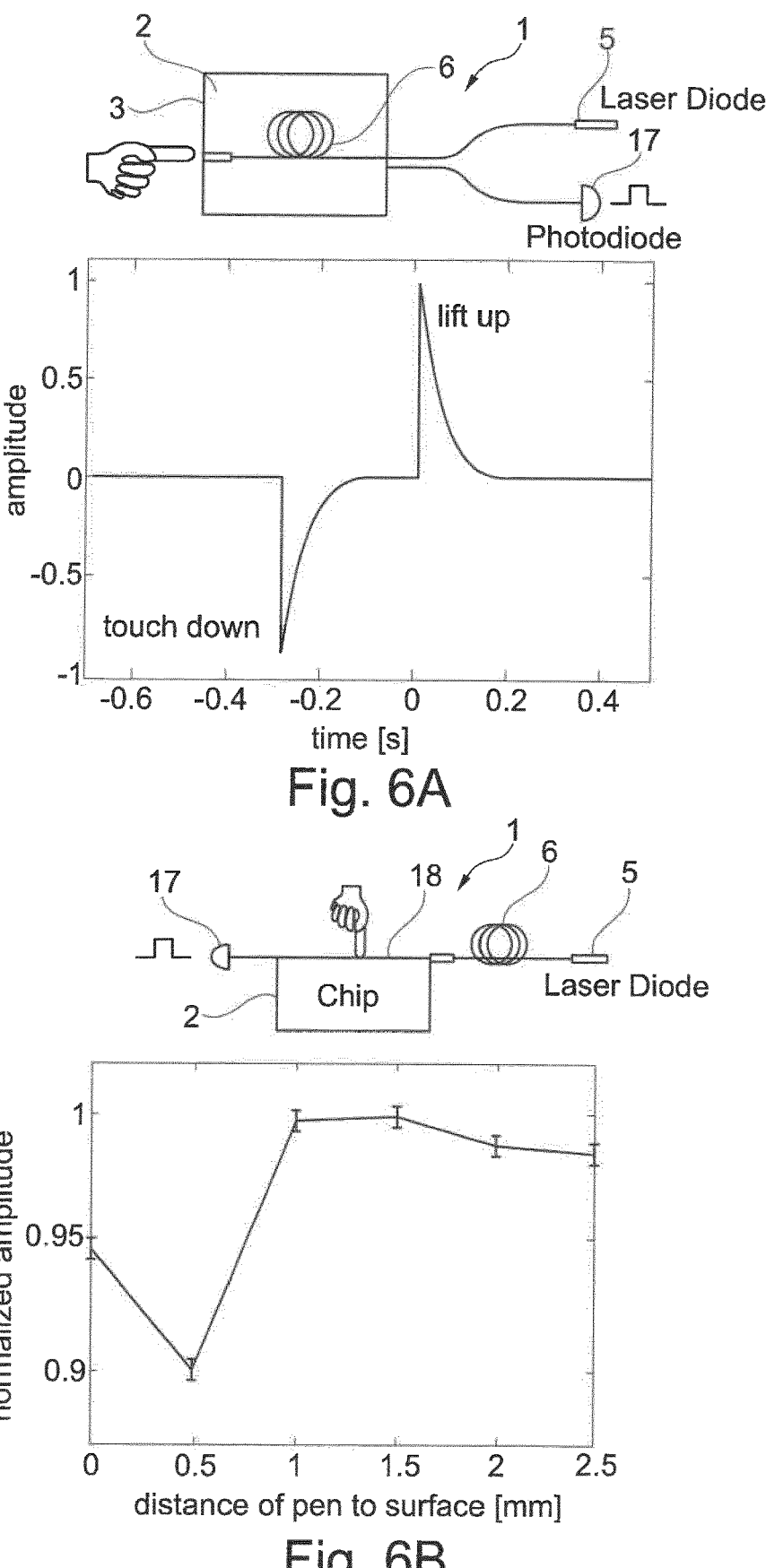
FIGS. 6A to 6C show different embodiments of an optical touch sensing device which enables touch recognition on a transparent substrate.

The first technique according to a preferred embodiment of the second aspect of the present invention relies on the fact that Fresnel backreflections into an optical waveguide change if an object such as a finger touches the output of a perpendicular-to-surface optical waveguide. This change in backreflection can be detected using a directional coupler and a photodiode and can be demonstrated experimentally using an optical fibre instead of a fused silica chip to avoid coupling problems (see the supplemental information below) since the optical properties of an optical fibre are very close to those of direct laser written optical waveguides. The change in backreflection in the direction of the light source generated by pressing a finger against the output of an optical fibre is shown in the graph of FIG. 6A, wherein the amplitude spikes downward upon a finger touching or blocking the output 6 of the light 4 and subsequently spikes upward upon removing i.e. lifting the finger away from the output 6. More data in this respect can be found in the supplementary information. Such changes can be measured using, for example, a fast photodiode 17 and an oscilloscope (in AC mode).

The second technique according to a further preferred embodiment of the second aspect of the present invention is preferably implemented by direct laser writing a grid of optical waveguides 6 below and close to the surface of the transparent substrate 2 and parallel thereto. This enables an evanescent field 18 to be formed at the surface 3 of the display from light 4 travelling through the optical waveguide. This evanescent field 18 is blocked if an object touches the surface 3 above the optical waveguide 6, thereby reducing the transmission of the light 4 through the optical waveguide 6. Additionally, the oily coating of the fingertips changes the total internal reflection condition again leading to a drop in transmitted light (see FIGS. 1B and 1C). This reduction in transmission of light can be measured with a diode and the data used in order to determine the touch location on the surface 3.

FIG. 6B shows an optical touch sensing device 1 according to an alternative preferred embodiment of the invention which applies the aforementioned second technique. It is illustrated how optical waveguides 6 may be direct laser written below and very close to the surface 3 of the transparent substrate 2. When light 4 is input into the optical waveguide 6, an evanescent field 18 is generated. At least some parts of the evanescent field 18 propagate above the transparent substrate 2. Touching the evanescent field 18 with, for example, a finger or a pen changes the transmission of light 4.

Figure 6C:
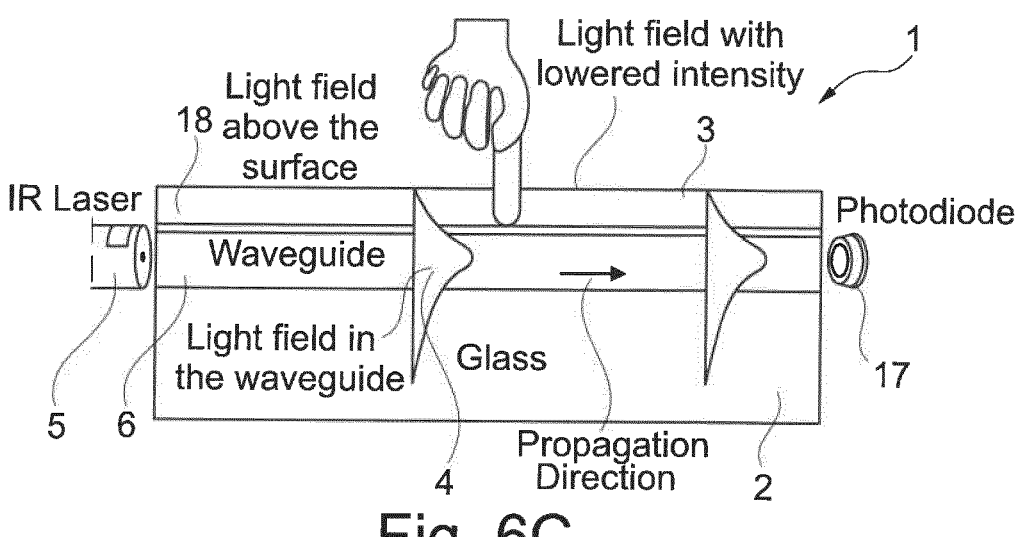

FIG. 6C shows a more detailed illustration of the alternative preferred embodiment of the invention shown in FIG. 6B.

In accordance with the graph shown in FIG. 6B, the functionality of a touch system according to a preferred embodiment of the present invention demonstrated. Light at a wavelength of 630 nm is input into an optical waveguide from an optical fibre and collected in free space by a photodiode to measure changes in transmission. The change of the amplitude of optical transmission in accordance to a pen approaching the surface is shown.

Figure 7A:
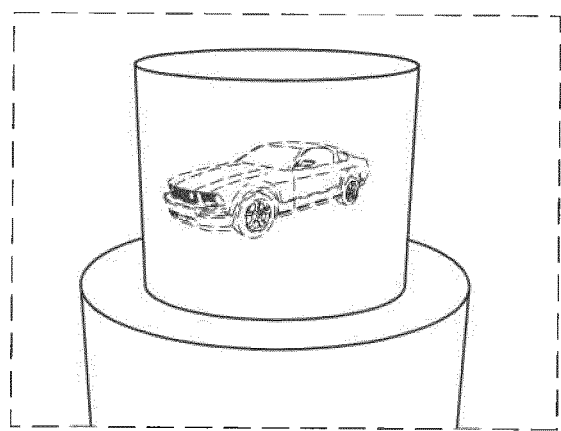
FIG. 7A to 7C show a volumetric display according to a preferred embodiment of the invention. Such volumetric displays are manufactured using direct laser writing by using the transparency of the substrate material and the directionality of light emission from the waveguides.
Figure 7B:
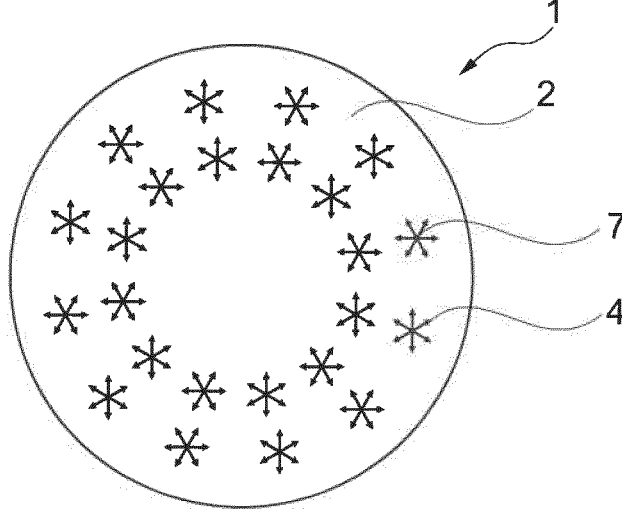
Figure 7C:
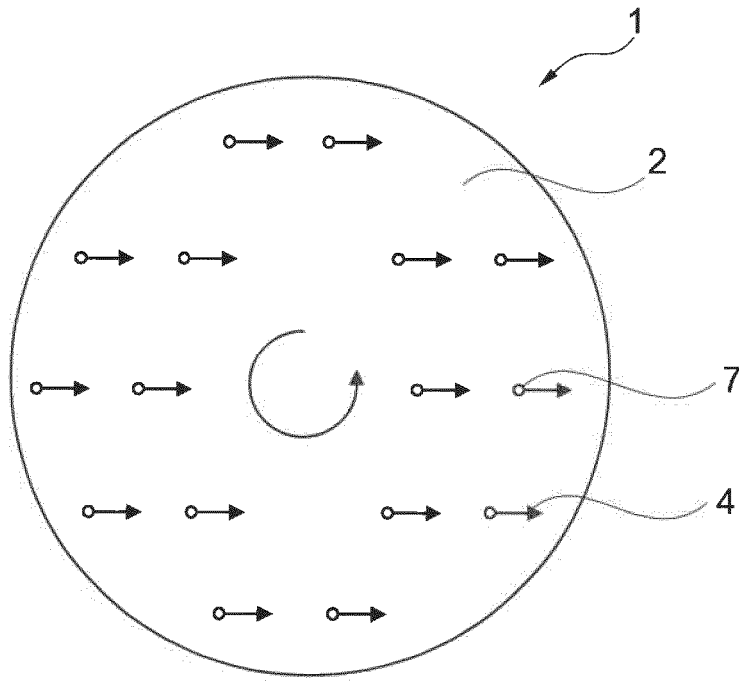

Writing depths of laser written optical waveguides of 7.52 mm have already been demonstrated. Once writing depths of tens of centimetres have been realised, volumetric displays can be realised by embedding optical waveguides deep inside a transparent substrate such as glass. An advantage of this approach is that optical waveguides emit light into a cone at their termination point i.e. output rather than emitting light uniformly. This beneficially allows for occlusion. However, in order to generate multiple different viewing angles, several optical waveguides are configured to terminate at a single point inside the volume (see FIG. 7B). In accordance with this implementation, quick rotation of the visual display at a frequency of, for example, greater than 30 Hz in combination with the persistence of vision of the human eye can optionally be implemented to greatly reduce the number of optical waveguides required (see FIG. 4C). In other implementations, lower rotation speeds are also possible by implementing several emission directions (e.g. two opposing ones would half the required rotation speed). Apart from the much lower necessary optical waveguides count an added benefit of the rotation is that the number of viewing angles around the rotation axis is only limited by the switching speed of the light source (horizontal parallax). Full parallax will still require several optical waveguides per "voxel" to implement multiple vertical viewing angles.

Providing improved volumetric to holographic displays requires increased numbers of pixels and increased density thereof as well as performance of phase control on them in case of the holographic display. Therefore, an advantage of implementing an optical waveguide visual display according to the preferred embodiments of the present invention is that it is easy to distribute the emission from a single light source over all pixels using directional couplers and controlling their relative phase using phase shifters. Additionally, the high level of transparency of devices according to preferred embodiments of the present invention can enable the creation of several closely spaced emission layers, effectively increasing the pixel density. Furthermore, such preferred embodiments of the present invention also provide increased flexibility in shape which can be implemented in order to create, for example, a curved display plane which greatly reduces the required pixel density.

In summary, preferred embodiments of the present invention propose optical devices which can be implemented in order to form a novel display including multiple optical waveguides forming pixels and/or voxels which provides advantages over current technology in terms of realising transparent, volumetric and holographic displays. Furthermore, preferred embodiments of the present invention also provide a novel type of touch recognition which is highly accurate, works underwater, can operate at very high speeds and is suitable for integration with transparent visual displays.

Supplementary Information

The following experimental information is provided in order to aid understanding of the present invention and its possible implementations.

Experimental Setup

In order to test the parameters for possible implementations of the present invention, an experiment was conducted using a fused silica chip with dimensions 50 mm×17 mm×1 mm (length, width, height). Written into the chip was a 5×5 array of straight waveguides, between 267 µm and 767 µm mm below the chip surface with a 50 µm spacing which make up a visual display (for manufacturing details see below).

The fused silica chip was mounted on a block of aluminium for maximum stability and light was coupled into the optical waveguides using a Nufern 780HP optical fibre, which itself was mounted on a translation stage (Thorlabs 6-Axis NanoMax). Light at wavelengths 450 nm and 540 nm was produced using a Choherent Chameleon Ti:Sapphire laser in combination with an A.P.E. HarmoniXX SHG. Light at 650 nm was produced using a Hobbes FC-2005 Fibre Checker Pro.

The pictures in FIG. 2 were made using a long-distance microscope (Optem 10× M Plan Apo objective with 0.6× Camera tube in combination with a 7:1 tunable zoom) and an Imaging Source DFK 24UP031 camera. Each optical waveguide was illuminated separately and the images subsequently superimposed after subtracting background noise. Overall insertion loss of the chip was 7 dB.

Manufacturing Details

The visual display and the touch recognition chip were fabricated using direct femtosecond-laser writing: in this process, an ultrashort laser pulse (200 fs, 0.3 mJ, 100 kHz, 800 nm) was tightly focused into a fused silica sample, causing nonlinear absorption and permanently increasing the refractive index in the focal volume. The guiding regions were traced out by a series of such pulses. For details in the chip layout see below.

Mode Field Diameters

Generally, the mode field diameter of an optical waveguide follows non-trivially from the refractive index profile. For step-index single mode waveguides the mode field diameter can be approximated by Marcuse's equation:

$$w(V, a) \approx 2(0.65 + \dfrac{1.619}{V_{3/2}} + \dfrac{2.879}{V_6}) \cdot a$$

wherein w is the mode field diameter, a the waveguide core diameter and $V=2\pi a/\lambda NA$ the fibre parameter with the wavelength A and the numerical aperture $NA=sqrt(n^2_{core}-n^2_{cladding})$. Setting $\partial\omega/\partial a=0$ shows that the smallest mode field radius is achieved for $V=1.8724$. Using coupled-mode equations the evanescent coupling strength dependent on optical waveguide separation can be calculated. As shown in Table 1, the optical waveguide spacing strongly depends on the index contrast/numerical aperture of the optical waveguide. All values were calculated using a wavelength of 650 nm, since it is the longest wavelength typically used in colour displays. Shorter wavelengths allow for smaller mode field diameters, hence allowing for a closer spacing, at least in the case of single mode propagation. If several wavelengths propagate in one waveguide some of them might experience multi-mode behaviour, depending on the cut-off wavelength of the waveguide.

It should be noted that femto-second laser direct written waveguides have a more complex index profile than a step-index and the calculations presented should therefore be seen as an approximation.

The minimum waveguide spacing holds true for the entire propagation length in the transparent substrate material and for the region where light is coupled with the optical waveguides unless transparent active optical switches can be implemented into the substrate, potentially allowing slightly higher pixel densities. Other options for possible implementations of the present invention would be to strongly mismatch the propagation constants of neighbouring optical waveguides to suppress evanescent coupling or to allow for coupling between the waveguides but to tailor the coupling region in such a way that the light couples back to its origin optical waveguide when the optical waveguide arrives at its end point. If perfect transparency is not required orthogonally-polarised light can be sent into neighbouring optical waveguides allowing leaked light to be blocked at the display surface of the transparent substrate by a polariser.

Anderson localisation may also be used to confine the light in the original waveguides.

Touch Recognition

Two different ways of implementing touch recognition using optical waveguides are provided according to implementations of one or more preferred embodiments of the present invention.

In the first approach perpendicular-to-surface optical waveguides are used for recognising a touch event and which, in a preferred implementation, are the same optical waveguides used to form the pixels of the visual display. According to this approach, at the interface between the surface of the transparent substrate (which may be made of, for example, silica) and air, Fresnel reflections occur thereby causing some of the light emitted from the output(s) of the optical waveguides to be reflected backwards towards the light source(s). The amount of light that is reflected backwards depends on the refractive index difference of, in an exemplary implementation, silica and air. If an object, for example a finger, touches the output of an optical waveguide, this difference changes, since the fingertip has a different index of refraction than air due to it being oily and watery. This change in the backreflection can be monitored using e.g. a fibre beam-splitter and a photodiode. During experimentation, it was determined that touching the output of a chip lead to a shift in the fibre-chip coupling which could potentially yield erroneous results. In order to demonstrate the effect achieved by this preferred implementation of the present invention, the output of an optical fibre (Nufern 780HP) was touched because it has properties very similar to those of the integrated optical waveguides of the present invention. A 785 nm laser diode (Thorlabs LP785-SF20) was used and was stabilised against backreflection with an optical isolator (Thorlabs IOT-5-780-MP), a single mode fibre-beam-splitter (Thorlabs FC780-50B-FC/PC) and a fast photo diode (Thorlabs DET10A). The light emitted from the laser (2 mW) was launched into one of the input modes of the fibre-beam splitter and one output mode was used as "touch-fibre". The fast photodiode was connected to the other input mode and its output voltage monitored with an oscilloscope (R&S RTM3004) in AC input-mode (high impedance). Touching the output of the optical fibre with a finger resulted in a signal as presented in FIG. 3A. Since the amount of backreflection depends on the refractive index of the material touching the facet of the waveguide, it is straight forward to discriminate between e.g. a finger touch and water according to preferred embodiments of the second aspect of the present invention. Using an anti-reflection coated fibre (for 780 nm) lead to particularly pronounced changes in the backreflection amplitude: backreflection increased by 46% when the fibre facet was water-coated and by 88% when the facet was touched by a finger.

For the second touch recognition approach according to an alternative preferred embodiment of the present invention, the evanescent field of light emitted from optical waveguides written at a very close distance parallel to the surface of the transparent substrate. At least part of the light emitted from the optical waveguides propagates above the display plane of the surface of the transparent substrate and can be blocked by an object touching it such as a finger. In order to measure this effect, during experimentation, light with a wavelength of 633 nm was input into the optical waveguide and the intensity drop at the output was monitored. To correct for input-coupling changes, that could occur when the fused silica chip is touched, an additional reference waveguide was fabricated at higher depth in the sample and coupled to the same input optical waveguide as the surface optical waveguide in the form of a Y-junction. This enabled measurement of the relative transmission of the surface optical waveguide compared to the reference optical waveguide, which was independent of the coupling performance to the chip. Instead of using a finger as the object, a rubber-tipped pen was used as the touch object. A translation stage was used to lower the pen onto the chip surface in 0.5 mm steps. When the rubber tipped pen touched the chip the transmission through the surface waveguide dropped by 4%, a change that is significantly higher than the power measurement error of 0.4%.

The commonly-used resistive and capacitive touch recognition systems found in conventional smartphones have latencies above $10^{-2}$ s and increasing their speed is difficult because of the noise produced by other electrical components in the smartphone (or similar). The optical approach adopted by the present invention enables performance at much higher frequencies, limited only by the photodiode readout speed and the time the light propagates through the display which are both at the $10^{-9}$ s level. Due its high frequency, the light emitted is not adversely influenced by the noise from other electronic components.

Light Coupling Considerations

For implementations of one or more preferred embodiments of the present invention, even though the light for all pixels could in principle be generated by a single light source, or at least three light sources in the case of colour images, for most scenarios it is preferable to have separate light sources connected to each individual optical waveguide corresponding to each pixel. The surface area of the transparent substrate required in order to connect light sources to each optical waveguide can be determined by the minimum pixel spacing multiplied by the total pixel count. A surface area similar to that of the visual display area of the transparent substrate can be achieved if the pixels are spaced as closely as possible to one another.

In further implementations, transparent phase-shifters can be implemented in the substrate in order to greatly reduce the number of light sources needed. The power from one optical waveguide could thereby be distributed over several pixels using interferometric structures close to the respective pixel position.

For implementing the present invention, different types of light sources may be coupled to the optical waveguides. In principle all major display technologies are compatible with the present invention and can be used in conjunction therewith provided that the light from each pixel of the given display technology is coupled with each optical waveguide of the present invention. The performance of such coupling with the waveguides is dependent on the mode field distribution. A preferred implementation of the first aspect of the invention would be to insert (sandwich) a visual display in the form of an LCD layer between two pieces of transparent substrate, ideally using glass as the substrate. Such an implementation is essentially very similar to the aforementioned backlight embodiment wherein the optical waveguides form an LCD backlight, with the further feature that the light emitted from the outputs of the plurality of optical waveguides of the first (piece of) transparent substrate is further coupled into the inputs of a plurality of optical waveguides of the second (piece of) transparent substrate i.e. glass, having passed through the LCD layer upon which the second transparent substrate lies on top of.

Generally, in preferred implementations, it is easier to use multi-mode optical waveguides which have a larger size and strongly decrease the requirements in the modal overlap between a light source and an optical waveguide. On the other hand, multi-mode optical waveguides typically have bigger bending radii. According to a further implementation, the light source(s) may be situated remotely from the display by means of sending the emitted light via optical fibre to the optical waveguides in the transparent substrate which forms a visual display.

An advantage in the manufacture of such optical devices according to the present invention compared to conventional semiconductor displays and/or touch recognition devices is that the present invention does not require a single monolithic structure to provide all light. In contrast, with the manufacture of conventional devices, the likelihood of a defect occurring during production is proportional to and increases with the size of the display i.e. the larger a display is and the more pixels it contains, the more likely it is that a defect will occur during production.

The invention claimed is:

1. An optical device for controlling light comprising:
   a transparent substrate having a surface for emitting light from one or more external single-mode light sources;
   one or more optical waveguides for guiding the emitted light, wherein the one or more waveguides are formed within the transparent substrate by direct laser writing and each of the one or more optical waveguides extending through the transparent substrate before curving toward the surface and each of the waveguides terminating at a plurality of outputs, wherein light that is coupled from one of the one or more external light sources into a corresponding one of the one or more optical waveguides is distributed to the plurality of outputs of the corresponding one of the one or more optical waveguides, wherein the plurality of outputs are within the transparent substrate spaced apart from the surface of the transparent substrate;
   each of the one or more waveguides comprising one or more directional couplers configured for distributing light to the plurality of outputs of the corresponding waveguide.

2. The optical device of claim 1 further comprising a plurality of the optical waveguides, wherein the outputs of the plurality of optical waveguides form a visual display.

3. The optical device of claim 1, further comprising a plurality of the optical waveguides, wherein the outputs of the plurality of optical waveguides form a backlight for a visual display.

4. The optical device of claim 3 wherein the plurality of waveguides comprises one waveguide for each subpixel of the visual display.

5. The optical device of claim 3, wherein the transparent substrate comprises wedges for reflecting light towards the one or more outputs or the surface of the transparent substrate.

6. The optical device of claim 2, further comprising:
   one or more light sources configured to transmit light into an input of each of the plurality of optical waveguides, wherein the one or more light sources include multimode light sources.

7. The optical device of claim 2, wherein the outputs of the plurality of optical waveguides form an array.

8. The optical device of claim 1, wherein the outputs of the plurality of optical waveguides are formed at different distances from the surface of the transparent substrate.

9. The optical device of claim 1, wherein the transparent substrate consists of one of glass, crystal, or thermoplastic polymer.

10. An integrated optical touch sensing display device comprising the optical devices of claim 1.

11. An optical device for controlling light comprising:
   a transparent substrate having a surface for emitting light from one or more external single-mode light sources;
   one or more optical waveguides for guiding the emitted light, wherein the one or more waveguides are formed within the transparent substrate by direct laser writing and each of the one or more optical waveguides extending through the transparent substrate before curving toward the surface and each of the waveguides terminating at a plurality of outputs, wherein light that is coupled from one of the one or more external light sources into a corresponding one of the one or more optical waveguides is distributed to the plurality of outputs of the corresponding one of the one or more optical waveguides, wherein the plurality of outputs are within the transparent substrate or at the surface of the transparent substrate;
   each of the one or more optical waveguides comprising one or more directional couplers configured for distributing light to the plurality of outputs of the corresponding waveguide, wherein the one or more optical waveguides curve toward the surface between a corresponding one of the one or more directional couplers and a corresponding one of the plurality of outputs;
   wherein each of the one or more optical waveguides extends from one or more inputs for coupling in light from a respective one of the one or more external light sources to one of the one or more directional couplers of the respective one of the one or more optical waveguides and each of the one or more optical waveguides split at the corresponding one of the one or more directional couplers of the respective one of the one or more optical waveguides into a first arm that curves towards the surface and extends to a corresponding one of the plurality of outputs of the respective one of the one or more optical waveguides and into a second arm that extends through the transparent substrate at least partially parallel to the surface.

12. The optical device of claim 11, wherein the transparent substrate consists of one of borosilicate glass, sapphire, or thermoplastic polymer.

13. The optical device of claim 11, wherein the one or more optical waveguides extend at least between the corresponding one of the one or more directional couplers and the corresponding one of the plurality of outputs.

14. The optical device of claim 11, wherein the one or more optical waveguides split at the one or more directional couplers.

15. The optical device of claim 1, wherein the transparent substrate has an input surface which is orthogonal to the surface for emitting light and an input of each of the one or more optical waveguides is at the input surface, wherein the one or more waveguides curve away from the surface for emitting light before curving toward the surface for emitting light.

16. The optical device of claim 11, comprising one or more light sources configured to transmit light into an input of each of the one or more optical waveguides, wherein the one or more light sources are single mode light sources.

17. The optical device of claim 11, wherein at each one of the directional couplers the first arm and the second arm of the corresponding one of the one or more optical waveguides extend for a section parallel to and spaced apart from each other before the first arm curves towards the surface for emitting light.

18. The optical device of claim 2, wherein the visual display comprises pixels, wherein the plurality of outputs of the one or more waveguides each correspond to one of the pixels, wherein each of the one or more directional couplers of the one or more optical waveguides comprises an interferometric structure proximate a position of the respective output of the respective one of the one or more waveguides, wherein the transparent substrate comprises transparent phase-shifters for controlling relative phases of the pixels.

19. An optical device for controlling light comprising:
   a transparent substrate having one or more surfaces for emitting light from one or more external single-mode light sources;
   one or more optical waveguides for guiding the emitted light, the one or more optical waveguides comprising direct laser written optical waveguides in the transparent substrate, and each of the one or more optical waveguides extending through the transparent substrate before curving toward the one or more surfaces and each of the waveguides terminating at a plurality of outputs, wherein light coupled from one of the one or more external light sources into a corresponding one of the one or more optical waveguides is distributed to the plurality of outputs of the corresponding one of the one or more optical waveguides, wherein the plurality of outputs are within the transparent substrate or at the one or more surfaces of the transparent substrate;
   each of the one or more waveguides comprising one or more directional couplers configured for distributing light to the plurality of outputs of the corresponding waveguide, wherein each of the one or more optical waveguides comprises at each one of the one or more directional couplers a first arm and a second arm, which extend for a section parallel to and spaced apart from each other, wherein following the section the second arm curves towards the one or more surfaces and extends to a corresponding one of the plurality of outputs of the respective one of the one or more optical waveguides.

20. The optical device of claim 19, wherein the second arm of each of the one or more waveguides at each directional coupler originates at the respective directional coupler.

*   *   *   *   *